US010154064B2

(12) United States Patent
Srivastava et al.

(10) Patent No.: US 10,154,064 B2
(45) Date of Patent: Dec. 11, 2018

(54) SYSTEM AND METHOD FOR ENABLING END-USER LICENSE ENFORCEMENT OF ISV APPLICATIONS IN A HYBRID CLOUD SYSTEM

(71) Applicant: VMWARE, INC., Palo Alto, CA (US)

(72) Inventors: Gaurav Srivastava, Bangalore (IN); Vinay Eswara, Bangalore (IN); Jai Krishna, Bangalore (IN); Jonathan Cook, Palo Alto, CA (US)

(73) Assignee: VMWARE, INC., Palo Alto, CA (US)

( * ) Notice: Subject to any disclaimer, the term of this patent is extended or adjusted under 35 U.S.C. 154(b) by 289 days.

(21) Appl. No.: 15/091,574

(22) Filed: Apr. 6, 2016

(65) Prior Publication Data

US 2017/0177840 A1 Jun. 22, 2017

(30) Foreign Application Priority Data

Dec. 22, 2015 (IN) .......................... 6832/CHE/2015

(51) Int. Cl.
*H04L 29/06* (2006.01)
*G06F 9/455* (2018.01)
*G06F 9/48* (2006.01)
*G06F 21/12* (2013.01)

(52) U.S. Cl.
CPC .......... *H04L 63/20* (2013.01); *G06F 9/45558* (2013.01); *G06F 9/4856* (2013.01); *G06F 21/126* (2013.01); *G06F 2009/4557* (2013.01); *G06F 2221/0773* (2013.01)

(58) Field of Classification Search
None
See application file for complete search history.

(56) References Cited

U.S. PATENT DOCUMENTS

| 9,619,271 B1* | 4/2017 | Cropper | G06F 9/5077 |
| 2014/0278623 A1* | 9/2014 | Martinez | G06Q 10/06 705/7.12 |
| 2015/0120555 A1* | 4/2015 | Jung | G06Q 20/40 705/44 |
| 2015/0261713 A1* | 9/2015 | Kuch | G06F 9/44505 710/104 |
| 2015/0263960 A1* | 9/2015 | Kasturi | H04L 47/22 370/230.1 |

(Continued)

OTHER PUBLICATIONS

Computer Desktop Encyclopedia definition of "processor": http://lookup.computerlanguage.com/host_app/search?cid=C999999&term=processor&lookup.x=0&lookup.y=0.*

(Continued)

*Primary Examiner* — Jeremiah L Avery
(74) *Attorney, Agent, or Firm* — Loza & Loza, LLP

(57) ABSTRACT

System and computer-implemented method for enabling end-user license enforcement of an application in a hybrid cloud system use data associated with at least one component of a public cloud computing environment of the hybrid cloud system to detect an environment-changing event involving at least one processing entity in the hybrid cloud system. Once the environment-changing event is detected, one or more operating environment identifiers are injected into the processing entity. The injected operating environment identifiers can then be accessed by an application in the processing entity to perform an end-user license check for enforcement.

26 Claims, 10 Drawing Sheets

(56) References Cited

U.S. PATENT DOCUMENTS

| 2016/0048408 A1* | 2/2016 | Madhu | G06F 11/1458 |
| | | | 718/1 |
| 2016/0358408 A1* | 12/2016 | Ovalle | G07F 17/329 |
| 2017/0093966 A1* | 3/2017 | Cropper | H04L 67/1025 |
| 2017/0116012 A1* | 4/2017 | Cropper | G06F 9/5077 |
| 2017/0168985 A1* | 6/2017 | Hwang | H04L 43/028 |

OTHER PUBLICATIONS

Waqas, Ahmad; Yusof, Zulkefli Muhammed; Shah, Asadullah. Fault Tolerant Cloud Auditing. 2013 5th International Conference on Information and Communication Technology for the Muslim World (ICT4M). https://ieeexplore.ieee.org/stamp/stamp.jsp?tp=&arnumber=6518924 (Year: 2013).*

Dinadayalan, P. Dr.; Jegadeeswari, S.; Gnanambigai, D. Dr. Data Security Issues in Cloud Environment and Solutions. 2014 World Congress on Computing and Communication Technologies. https://ieeexplore.ieee.org/stamp/stamp.jsp?tp=&arnumber=6755112 (Year: 2014).*

Ferry, Nicolas et al. Towards model-driven provisioning, deployment, monitoring, and adaptation of multi-cloud systems. 2013 IEEE Sixth International Conference on Cloud Computing. https://ieeexplore.ieee.org/stamp/stamp.jsp?tp=&arnumber=6740239 (Year: 2013).*

* cited by examiner

SYSTEM AND METHOD FOR ENABLING END-USER LICENSE ENFORCEMENT OF ISV APPLICATIONS IN A HYBRID CLOUD SYSTEM

RELATED APPLICATIONS

Benefit is claimed under 35 U.S.C. 119(a)-(d) to Foreign application Serial No. 6832/CHE/2015 filed in India entitled "SYSTEM AND METHOD FOR ENABLING END-USER LICENSE ENFORCEMENT OF ISV APPLICATIONS IN A HYBRID CLOUD SYSTEM", filed on Dec. 22, 2015, by VMware, Inc., which is herein incorporated in its entirety by reference for all purposes.

BACKGROUND

Cloud architectures are used in cloud computing and cloud storage systems for offering infrastructure-as-a-service (IaaS) cloud services. Examples of cloud architectures include the VMware vCloud® Air™ cloud architecture software, Amazon EC2™ web service, and OpenStack™ open source cloud computing service. IaaS cloud service is a type of cloud service that provides access to physical and/or virtual resources in a cloud environment. These services provide a tenant application programming interface (API) that supports operations for manipulating IaaS constructs, such as virtual machines (VMs) and logical networks.

A hybrid cloud system aggregates the resource capability from both private and public clouds. A private cloud can include one or more customer data centers (referred to herein as "on-premise data centers"). The public cloud can include a multi-tenant cloud architecture providing IaaS cloud services. In a hybrid cloud system, it is desirable to support VM migration between the on-premise data centers and the public cloud for various reasons, such as workload management. However, independent software vendor (ISV) applications that may be running on VMs typically have different end-user license terms for running on a public cloud and running on a private cloud. Thus, a mechanism should be available to allow ISV applications running on VMs in a hybrid cloud system to apply different end-user license terms when the VMs are moved between the private and public clouds.

SUMMARY

System and computer-implemented method for enabling end-user license enforcement of an application in the hybrid cloud system use data associated with at least one component of a public cloud computing environment of the hybrid cloud system to detect an environment-changing event involving at least one processing entity in the hybrid cloud system. Once the environment-changing event is detected, one or more operating environment identifiers are injected into the processing entity. The injected operating environment identifiers can then be accessed by an application in the processing entity to perform an end-user license check for enforcement.

A computer-implemented method for enabling end-user license enforcement of an application in a hybrid cloud system in accordance with an embodiment of the invention comprises monitoring data associated with at least one component of a public cloud computing environment of the hybrid cloud system, detecting an environment-changing event involving at least one processing entity in the hybrid cloud system using the monitored data, temporarily interrupting the environment-changing event to provide an interrupt period, and during the interrupt period, injecting one or more operating environment identifiers into the processing entity that can be accessed by an application in the processing entity to perform an end-user license check for enforcement. In some embodiments, the steps of this method are performed when program instructions contained in a computer-readable storage medium are executed by one or more processors.

A computer system in accordance with an embodiment of the invention comprises memory and one or more processors configured to monitor data associated with at least one component of a public cloud computing environment of the hybrid cloud system, detect an environment-changing event involving at least one processing entity in the hybrid cloud system using the monitored data, temporarily interrupt the environment-changing event to provide an interrupt period, and during the interrupt period, inject one or more operating environment identifiers into the processing entity that can be accessed by an application in the processing entity to perform an end-user license check for enforcement.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
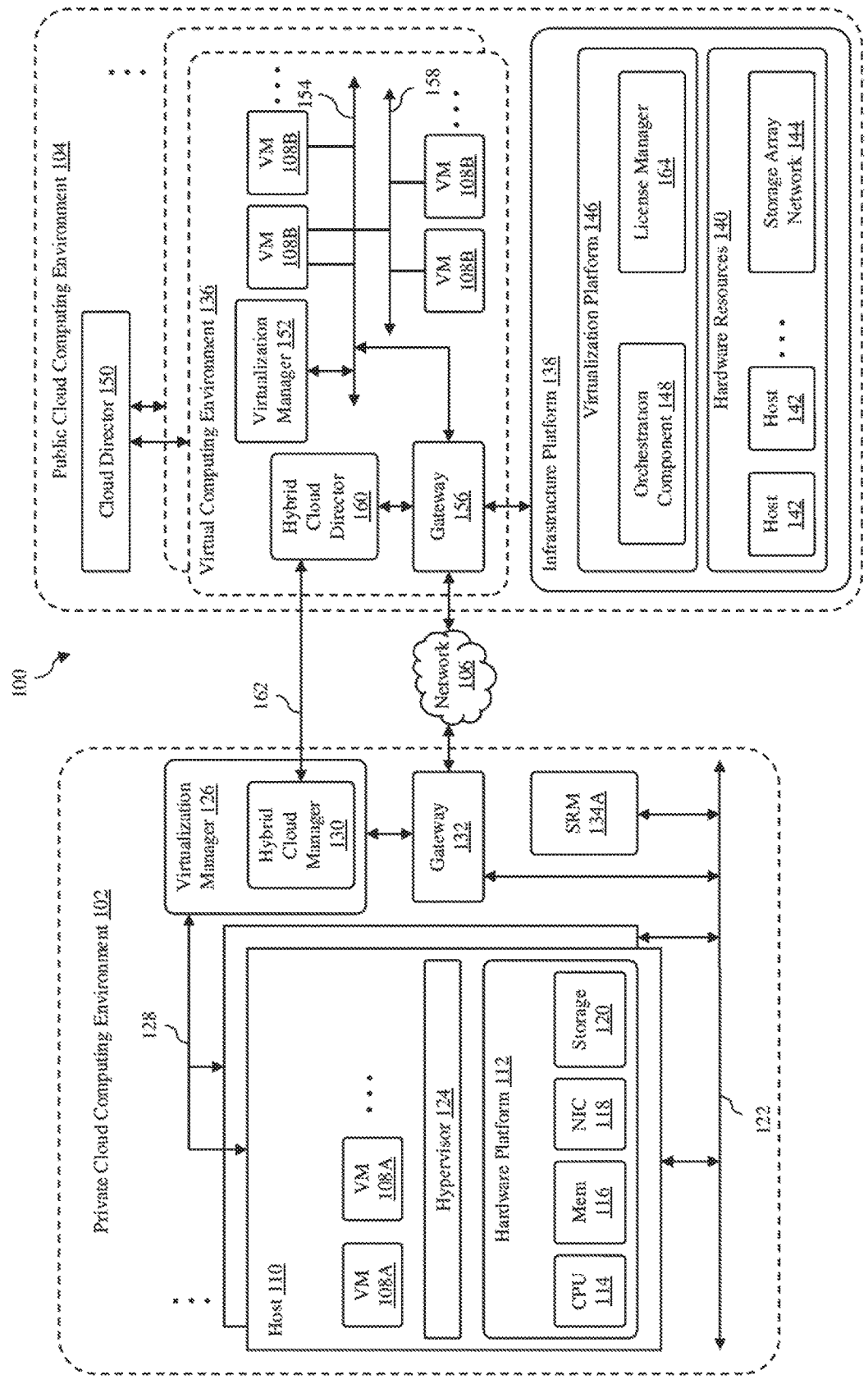
FIG. 1 is a block diagram of a hybrid cloud system in accordance with an embodiment of the invention.

Turning now to FIG. 1, a block diagram of a hybrid cloud system 100 in accordance with an embodiment of the invention is shown. The hybrid cloud system includes at least one private cloud computing environment 102 and at least one public cloud computing environment 104 that are connected via a network 106. The hybrid cloud system is configured to provide a common platform for managing and executing workloads seamlessly between the private and public cloud computing environments. In one embodiment, the private cloud computing environment may be controlled and administrated by a particular enterprise or business organization, while the public cloud computing environment may be operated by a cloud computing service provider and exposed as a service available to account holders, such as the particular enterprise in addition to other enterprises. In some embodiments, the private cloud computing environment may be a private or on-premise data center.

The private and public cloud computing environments 102 and 104 of the hybrid cloud system 100 include computing and/or storage infrastructures to support a number of processing entities 108A and 108B. As used herein, the term "processing entity" refers to any software entity that can run on a computer system, such as a software application, a software process, a virtual machine (VM), e.g., a VM supported by virtualization products of VMware, Inc., and a software "container", e.g., a Docker container. However, in this disclosure, the processing entities will be described as being VMs, although embodiments of the invention described herein are not limited to VMs.

The VMs 108 running in the private and public cloud computing environments 102 and 104 may have one or more independent software vendor (ISV) applications running on them. In some cases, a single ISV application may run on multiple VMs. ISV applications are software applications that are designed for mass or niche markets, not for specific customers. An ISV application typically has an end-user license agreement that defines various use conditions and requirements ("end-user license terms") for the application. Some of the end-user license terms of an ISV application may be direct to the cloud computing environment on which the ISV application is ran. As an example, the end-user license terms may specify that the ISV application can only be run in a private cloud computing environment or a public cloud computing environment. As another example, the end-user license terms may specify the number of instances of the ISV application that can be run in a particular cloud computing environment. Some of the end-user license terms of an ISV application may be directed to the geographical location where the ISV application is running. As an example, the end-user license terms may define in which country or countries the ISV application can be run. Some of the end-user license terms of an ISV application may also be directed to the hardware platform or infrastructure on which the ISV application is running. As an example, the end-user license terms may specify that the ISV application can only be run on a computer having at least certain processing power and/or at least certain amount of memory. The end-user license terms of an ISV application may be directed to other aspects of the operating environment in which the ISV application may be run.

As explained below, the hybrid cloud system 100 supports movement of the VMs 108 between the private and public cloud computing environments 102 and 104. As used herein, VM movements include situations in which one or more copies of VMs running in one environment are activated at another environment, for example, as part of a disaster recovery operation. Thus, the environment in which the ISV applications of the VMs are running may change when the VMs are migrated from one cloud computing environment to another. The hybrid cloud system provides a mechanism to provide identifiers that specify the operating environment in which a VM is running so that an ISV application running on that VM can enforce its end-user license terms as applied to that operating environment using the operating environment identifiers.

As shown in FIG. 1, the private cloud computing environment 102 of the hybrid cloud system 100 includes one or more host computer systems ("hosts") 110. The hosts may be constructed on a server grade hardware platform 112, such as an x86 architecture platform. As shown, the hardware platform of each host may include conventional components of a computing device, such as one or more processors (e.g., CPUs) 114, system memory 116, a network interface 118, storage system 120, and other I/O devices such as, for example, a mouse and a keyboard (not shown). The processor 114 is configured to execute instructions, for example, executable instructions that perform one or more operations described herein and may be stored in the memory 116 and the storage system 120. The memory 116 is volatile memory used for retrieving programs and processing data. The memory 116 may include, for example, one or more random access memory (RAM) modules. The network interface 118 enables the host 110 to communicate with another device via a communication medium, such as a network 122 within the private cloud computing environment. The network interface 118 may be one or more network adapters, also referred to as a Network Interface Card (NIC). The storage system 120 represents local storage devices (e.g., one or more hard disks, flash memory modules, solid state disks and optical disks) and/or a storage interface that enables the host to communicate with one or more network data storage systems. Example of a storage interface is a host bus adapter (HBA) that couples the host to one or more storage arrays, such as a storage area network (SAN) or a network-attached storage (NAS), as well as other network data storage systems. The storage system 120 is used to store information, such as executable instructions, cryptographic keys, virtual disks, configurations and other data, which can be retrieved by the host.

Each host 110 may be configured to provide a virtualization layer that abstracts processor, memory, storage and networking resources of the hardware platform 112 into the processing entities, e.g., the VMs 108A, that run concurrently on the same host. The VMs run on top of a software interface layer, which is referred to herein as a hypervisor 124, that enables sharing of the hardware resources of the host by the VMs. One example of the hypervisor 124 that may be used in an embodiment described herein is a VMware ESXi™ hypervisor provided as part of the VMware vSphere® solution made commercially available from VMware, Inc. The hypervisor 124 may run on top of the operating system of the host or directly on hardware components of the host. For other types of processing entities, the host may include other virtualization software platforms to support those processing entities, such as Docker virtualization platform to support software containers.

The private cloud computing environment 102 includes a virtualization manager 126 that communicates with the hosts 110 via a management network 128. In an embodiment, the virtualization manager 126 is a computer program that resides and executes in a computer system, such as one of the hosts, or in a processing entity, such as one of the VMs 108A running on the hosts. One example of the virtualization manager 126 is the VMware vCenter Server® product made available from VMware, Inc. The virtualization manager is configured to carry out administrative tasks for the private cloud computing environment, including managing the hosts, managing the VMs running within each host, provisioning VMs, migrating VMs from one host to another host, and load balancing between the hosts.

In one embodiment, the virtualization manager 126 includes a hybrid cloud manager 130 configured to manage and integrate computing resources provided by the private cloud computing environment 102 with computing resources provided by the public cloud computing environment 104 to form a unified "hybrid" computing platform. The hybrid cloud manager is configured to deploy processing entities, e.g., VMs 108A, in the private cloud computing environment, transfer VMs from the private cloud computing environment to the public cloud computing environment, and perform other "cross-cloud" administrative tasks. In one implementation, the hybrid cloud manager 130 is a module or plug-in to the virtualization manager 126, although other implementations may be used, such as a separate computer program executing in any computer system or running in a VM in one of the hosts. One example of the hybrid cloud manager 130 is the VMware vCloud® Connector™ product made available from VMware, Inc.

In one embodiment, the hybrid cloud manager 130 is configured to control network traffic into the network 106 via a gateway device 132, which may be implemented as a virtual appliance. The gateway device 132 is configured to provide the VMs 108A and other devices in the private cloud computing environment 102 with connectivity to external devices via the network 106. The gateway device 132 may manage external public Internet Protocol (IP) addresses for the VMs 108A and route traffic incoming to and outgoing from the private cloud computing environment and provide networking services, such as firewalls, network address translation (NAT), dynamic host configuration protocol (DHCP), load balancing, and virtual private network (VPN) connectivity over the network 106.

In some embodiments, the private cloud computing environment 102 may include a site recovery manager (SRM) 134A. The site recovery manager controls various operations at the private cloud computing environment, which is referred to herein as the primary site for purposes of disaster recovery, to provide disaster protection. As an example, the site recovery manager allows management of recovery plans, enables nondisruptive recovery testing and executes site recovery and migration processes. The disaster recovery manager works with one or more other site recovery managers at one or more secondary sites to perform various operations related to disaster protection, such as disaster recovery failover and failback operations. One example of the site recovery managers is the VMware vCenter™ Site Recovery Manager™ product from VMware, Inc.

The public cloud computing environment 104 of the hybrid cloud system 100 is configured to dynamically provide an enterprise (or users of an enterprise) with one or more virtual computing environments 136 in which an administrator of the enterprise may provision processing entities, e.g., the VMs 108B, and install and execute various applications, such as ISV applications executing on one or more VMs. The public cloud computing environment includes an infrastructure platform 138 upon which the virtual computing environments can be executed. In the particular embodiment of FIG. 1, the infrastructure platform includes hardware resources 140 having computing resources (e.g., hosts 142), storage resources (e.g., one or more storage array systems, such as a storage area network (SAN) 144), and networking resources (not illustrated), and a virtualization platform 146, which is programmed and/or configured to provide the virtual computing environments 136 that support the VMs 108B across the hosts 142. The virtualization platform may be implemented using one or more software programs that reside and execute in one or more computer systems, such as the hosts 142, or in one or more processing entities, such as the VMs 108B, running on the hosts.

In one embodiment, the virtualization platform 146 includes an orchestration component 148 that provides infrastructure resources to the virtual computing environments 136 responsive to provisioning requests. The orchestration component may instantiate VMs according to a requested template that defines one or more VMs having specified virtual computing resources (e.g., compute, networking and storage resources). Further, the orchestration component may monitor the infrastructure resource consumption levels and requirements of the virtual computing environments and provide additional infrastructure resources to the virtual computing environments as needed or desired. In one example, similar to the private cloud computing environment 102, the virtualization platform may be implemented by running on the hosts 142 VMware ESXi™-based hypervisor technologies provided by VMware, Inc. However, the virtualization platform may be implemented using any other virtualization technologies, including Xen®, Microsoft Hyper-V® and/or Docker virtualization technologies, depending on the processing entities being used in the public cloud computing environment 104.

In one embodiment, the public cloud computing environment 104 may include a cloud director 150 that manages allocation of virtual computing resources to an enterprise. The cloud director may be accessible to users via a REST (Representational State Transfer) API (Application Programming Interface) or any other client-server communication protocol. The cloud director may authenticate connection attempts from the enterprise using credentials issued by the cloud computing provider. The cloud director receives provisioning requests submitted (e.g., via REST API calls) and may propagate such requests to the orchestration component 148 to instantiate the requested VMs (e.g., the VMs 108B). One example of the cloud director is the VMware vCloud Director® product from VMware, Inc.

In one embodiment, at least some of the virtual computing environments 136 may be configured as a virtual data centers. Each virtual computing environment includes one or more processing entities, such as the VMs 108B, and one or more virtualization managers 152. The virtualization managers 152 may be similar to the virtualization manager 126 in the private cloud computing environment 102. One example of the virtualization manager 152 is the VMware vCenter Server® product made available from VMware, Inc. Each virtual computing environment may further include one or more virtual networks 154 used to communicate between the VMs 108B running in that environment and managed by at least one networking gateway device 156, as well as one or more isolated internal networks 158 not connected to the gateway device 156. The gateway device 156, which may be a virtual appliance, is configured to provide the VMs 108B and other components in the virtual computing environment 136 with connectivity to external devices, such as components in the private cloud computing environment 102 via the network 106. The gateway device 156 operates in a similar manner as the gateway device 132 in the private cloud computing environment.

In one embodiment, each virtual computing environments 136 includes a hybrid cloud director 160 configured to communicate with the corresponding hybrid cloud manager 130 in the private cloud computing environment 102 to enable a common virtualized computing platform between the private and public cloud computing environments. The hybrid cloud director may communicate with the hybrid cloud manager using Internet-based traffic via a VPN tunnel established between the gateways 132 and 156, or alternatively, using a direct connection 162. The hybrid cloud director and the corresponding hybrid cloud manager facilitate cross-cloud migration of processing entities, such as VMs 108A and 108B, between the private and public computing environments. This cross-cloud migration may include both "cold migration" in which the VM is powered off during migration, as well as "hot migration" in which the VM is powered on during migration.

Figure 2:
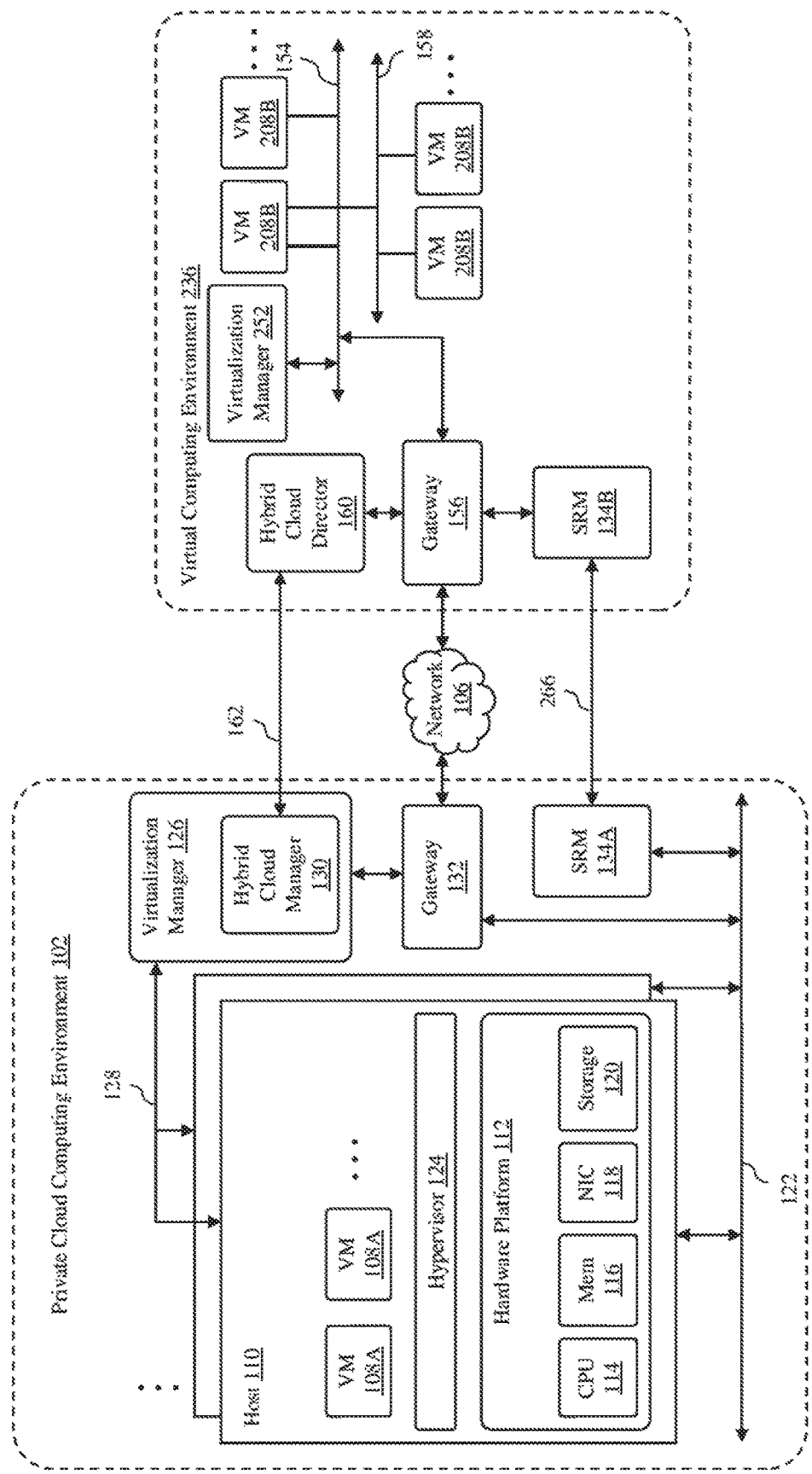
FIG. 2 is a block diagram of a virtual computing environment that functions as a secondary site for a private cloud computing environment of the hybrid cloud system in accordance with an embodiment of the invention.

In an embodiment, one or more virtual computing environments 136 may be configured as secondary sites for disaster recovery purposes. FIG. 2 illustrates such a virtual computing environment 236 that functions as a secondary site for the private cloud computing environment 102 in accordance with an embodiment of the invention. As shown in FIG. 2, the virtual computing environment 236 may include components similar to the components found in the virtual computing environment 136 illustrated in FIG. 1. However, some of these components in the virtual computing environment 236, such as VMs 208B and a virtualization manger 252, are copies of components in the private cloud computing environment 102, such as the VMs 108A and the virtualization manager 126, that are in standby mode and periodically updated using a replication mechanism. In addition, the virtual computing environment 236 further includes a site recovery manager (SRM) 134B. The site recovery manager 134B may be similar to the site recovery manager 134A in the private cloud computing environment 102, and may be able to communicate with the site recovery manager 134A using a direct connection 266. As explained above with respect to the site recovery manager 134A, these site recovery managers can work together to perform various operations related to disaster protection, such as disaster recovery failover and failback operations. One example of the site recovery manager 134B is the VMware vCenter™ Site Recovery Manager™ product from VMware, Inc.

As explained above, when the VMs 108 in the hybrid cloud system 100 are "moved" from one cloud computing environment to another, the operating environment of the ISV applications in the VMs will change, which may affect the end-user license terms of the ISV applications. In order for ISVs to enforce the end-user license terms of their ISV applications based on the operating environment of the ISV applications, the hybrid cloud system provides a mechanism to provide identifiers that specify the operating environment in which a particular VM is running so that each ISV application running on that VM can enforce its end-user license terms as applied to that operating environment using the operating environment identifiers.

The identifier-providing mechanism of the hybrid cloud system 100 is facilitated by a license manager 164, which is located in the public cloud environment 104 in the embodiment illustrated in FIG. 1. However, in other embodiments, the license manager may be located in the private cloud environment 102 or elsewhere. The license manager is configured to detect events in the hybrid cloud system that involve a change in the operating environment of the VMs 108 in the hybrid cloud system (referred to herein as "environment-changing events") to selectively associate one or more operating environment identifiers with the VMs on which ISV applications may be running so that the ISV application can enforce the licensing terms based on the operating environment identifiers.

Figure 3:
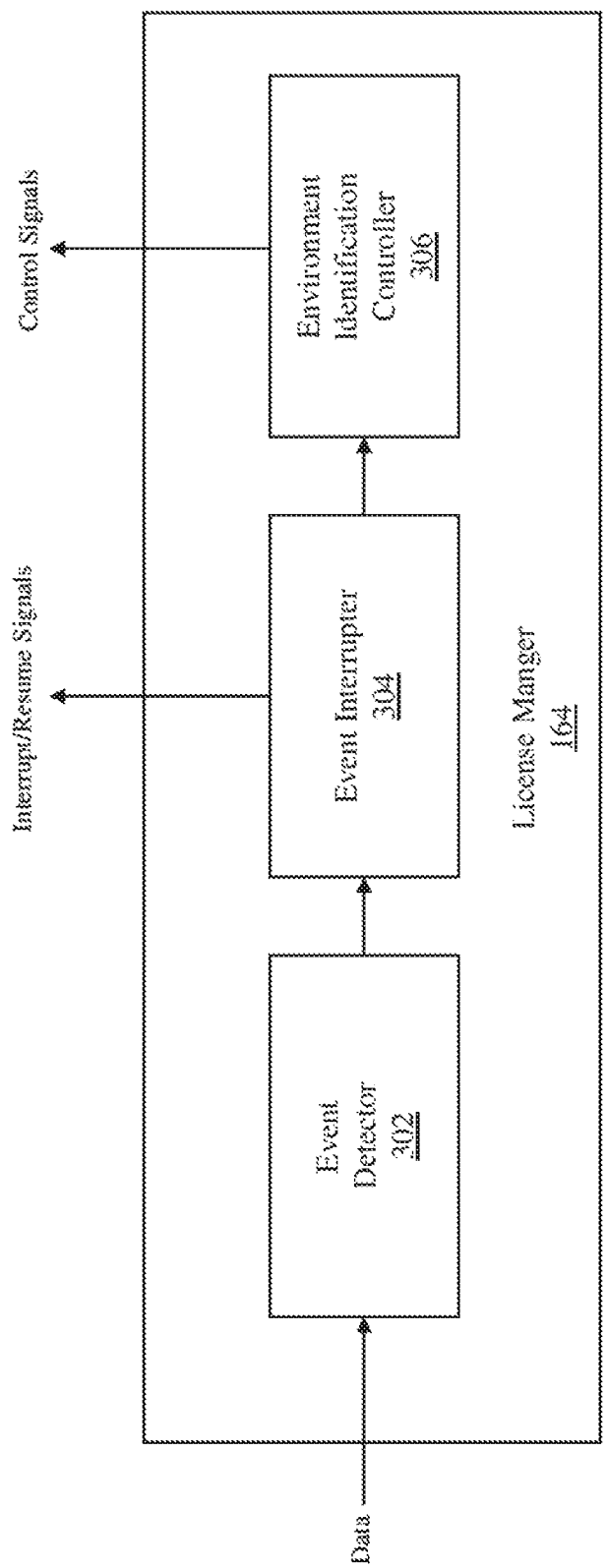
FIG. 3 is a block diagram of components of a license manager in the hybrid cloud system in accordance with an embodiment of the invention.

Turning now to FIG. 3, a block diagram of components of the license manager 164 in accordance with an embodiment of the invention is shown. As illustrated in FIG. 3, the license manager includes an event detector 302, an event interrupter 304 and an environment identification controller 306. These components of the license manager can be implemented as software, hardware or a combination of software and hardware. In a particular implementation, the license manger is installed directly in a management server, which is a physical computer, or in a processing entity, such as a VM, running on the management server. The management server may be similar to the host 110 of the private cloud computing environment 102 illustrated in FIG. 1. Thus, the management sever includes at least memory and one or more processors that execute instructions to perform the operations of the license manager described herein.

The event detector 302 of the license manager 164 is able to detect events in the hybrid cloud system 100 that involve a change in the operating environment of one or more VMs 108 in the hybrid cloud system by monitoring data being transmitted between certain components in the hybrid cloud system. The monitored data may include notifications, request messages, commands and other communications transmitted between components in the hybrid cloud system that indicate an environment-changing event. In an embodiment in which the cloud manager 130 is implemented using VMware vCloud Director® product from VMware, Inc., the event detector may listen for notifications emitted from the cloud manager on a particular message bus, e.g., a rabbitmq message bus, having the following routing key formats:

(1) true.#.com.vmware.vcloud.event.vm.*
(2) true.#.com.vmware.vcloud.event.vapp.*
(3) true.#.com.vmware.vcloud.event.vdc.*

Notifications from the cloud manager having the first format are VM level events. Notifications from the cloud manager having the second format are vApp (i.e., application container having one or more VMs) level events. Notifications from the cloud manager having the third format are cloud manager level events.

Three examples of environment-changing events will be described herein to illustrate the operations performed by the event detector 302. However, the event detector is not limited to detecting only these three environment-changing events, and may detect other environment-changing events.

The first example is a migration event of a VM between the private and public cloud environments 102 and 104. The migration event may be a live VM migration event or a cold VM migration event. A live migration event is the migration of a VM from the private cloud environment to the public cloud environment or from the public cloud environment to the private cloud environment without turning off the VM. A cold VM migration event is the migration of a VM, which is turned off, from the private cloud environment to the public cloud environment or from the public cloud environment to the private cloud environment. In one implementation, the event detector 302 may detect a VM migration event by monitoring data being transmitted to or from the cloud director 150 for a VM migration notification, which includes an identification of the VM being migrated and may include an identification of the source and destination environments of the VM, e.g., the source and destination data centers and/or the source and destination hosts. In other implementations, the event detector may detect a VM migration event by monitoring data being transmitted to and from the orchestration component 148, the virtualization managers 152 and/or the hybrid cloud director 160.

The second example is an import/export event of a VM between the private and public cloud computing environments 102 and 104. In the hybrid cloud system 100, a user can export a VM from its source environment, e.g., the private cloud computing environment 102. When a VM is exported, the VM with all its content and states is saved onto a file. The user can then import the VM into one or more destination environments, such as the public cloud computing environment 104, by copying the file with the saved VM and importing the VM from this file into the destination environments. In one implementation, the event detector 302 may detect a VM import/export event by monitoring data being transmitted to and from the virtualization managers 152 for an import notification or an export notification, which includes an identification of the VM being imported/exported and may also include an identification of the source or destination location of the VM. e.g., the particular source or destination computing environment and the source or destination host. In other implementations, the event detector may detect an import/export event by monitoring data being transmitted to and from the orchestration component 148, the cloud director 150 and/or the hybrid cloud director 160.

The third example is a disaster recovery event of a VM between the private and public cloud computing environments 102 and 104. When a disaster recovery failover mode is automatically or manually triggered for one or more protected VMs at the primary site (e.g., the private cloud computing environment 102), the copies of these VMs at the secondary site (e.g., the virtual computing environment 236), are activated at the secondary site. Typically, a disaster recovery failover mode is triggered due to some failure of the protected VMs at the primary site. When a disaster recovery failback mode is automatically or manually triggered for one or more activated VMs at the secondary site, these activated VMs are replicated at the primary site to restore them back to the primary site. This disaster recovery failover/failback mode processes can be viewed as essentially "moving" the protected VMs from the primary site to the secondary site and vice versa. In one implementation, the event detector 302 may detect a disaster recovery event by monitoring data being transmitted to the site recovery manager 134B for a failover/failback notification, which includes an identification of the VM being recovered and may also include identifications of the source and destination environments of the VM, e.g., the source and destination data centers and/or the source and destination hosts. In other implementations, the event detector may detect a disaster recovery event by monitoring data being transmitted to and from the orchestration component 148, the cloud director 150, the virtualization manager 152 and/or the hybrid cloud director 160.

After an environment-changing event (e.g., a migration event, an import/export event or a disaster recovery event) has been detected, the event interrupter 304 and the environment identification controller 306 of the license manager 164 may perform certain operations, depending on whether one or more VMs are being "moved" to the private cloud computing environment 102 or to the public cloud computing environment 104. When a VM is being "moved" into the public cloud computing environment due to an environment-changing event, the event interrupter traps or interrupts the environment-changing event to provide an interrupt period. In an embodiment, the environment-changing event is trapped after the location of the VM in the public cloud computing environment has been established, but before the completion of the environment-changing event. The detected environment-changing event may be interrupted for a desired period by transmitting an interrupt signal and a resume signal from the event interrupter to one or more appropriate components in the public cloud computing environment that are managing that event.

During the interrupt period, the environment identification controller 306 may retrieve information regarding the operating environment of the VM in the public cloud computing environment 104, such as the geographical location of the host in which the VM resides or will reside, the specific hardware platform of that host and other operating environment information that is unknown to the license manager 164. The operating environment information may be retrieved from the orchestration component 148, the cloud director 150, the virtualization manager 152 supporting the VM, the hybrid cloud director 160 and/or the site recovery manager 134B.

Figure 4A:
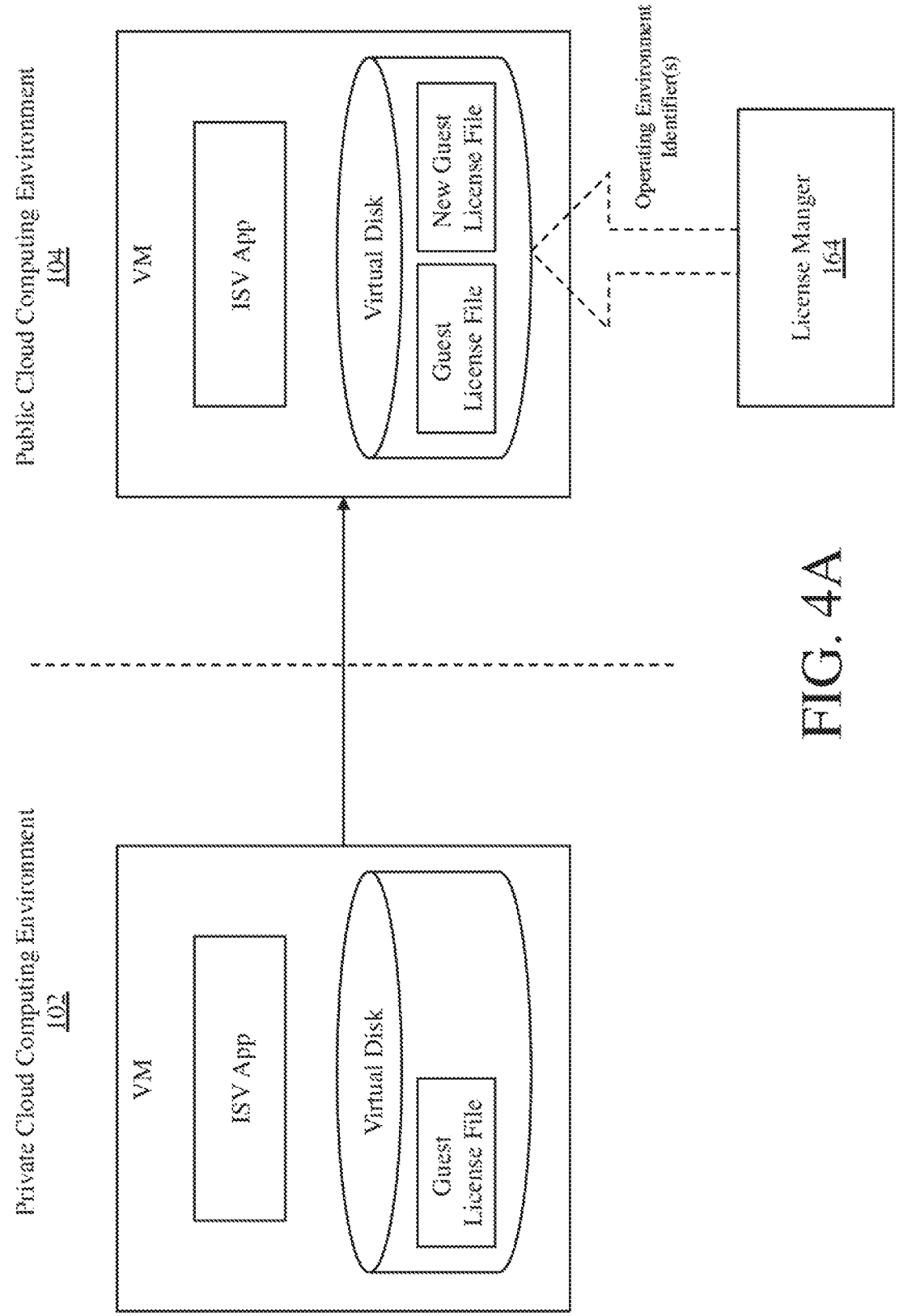
FIG. 4A illustrates one or more operating environment identifiers being inserted into an existing guest license file on a virtual disk of a VM or a new guest license file with one or more operating environment identifiers being created in the virtual disk of the VM in accordance with an embodiment of the invention.

Once the operating environment information of the VM has been retrieved, the environment identification controller 306 injects one or more operating environment identifiers that correspond to at least some of the operating environment information into the VM using control signals to accomplish the injection. In one embodiment, one or more operating environment identifiers are inserted into an existing guest license file on a virtual disk of the VM or a new guest license file with one or more operating environment identifiers is created in the virtual disk of the VM that can be read by an ISV application running on the VM during an end-user license check, as illustrated in FIG. 4A. In FIG. 4A, a VM with an ISV application and a virtual disk has been moved from the private cloud computing environment 102 to the public cloud computing environment 104. As shown in this figure, operating environment identifiers are inserted into an existing guest license file in the virtual disk of the VM or a new guest license file with the operating environment identifiers is created in the virtual disk of the VM.

Figure 4B:
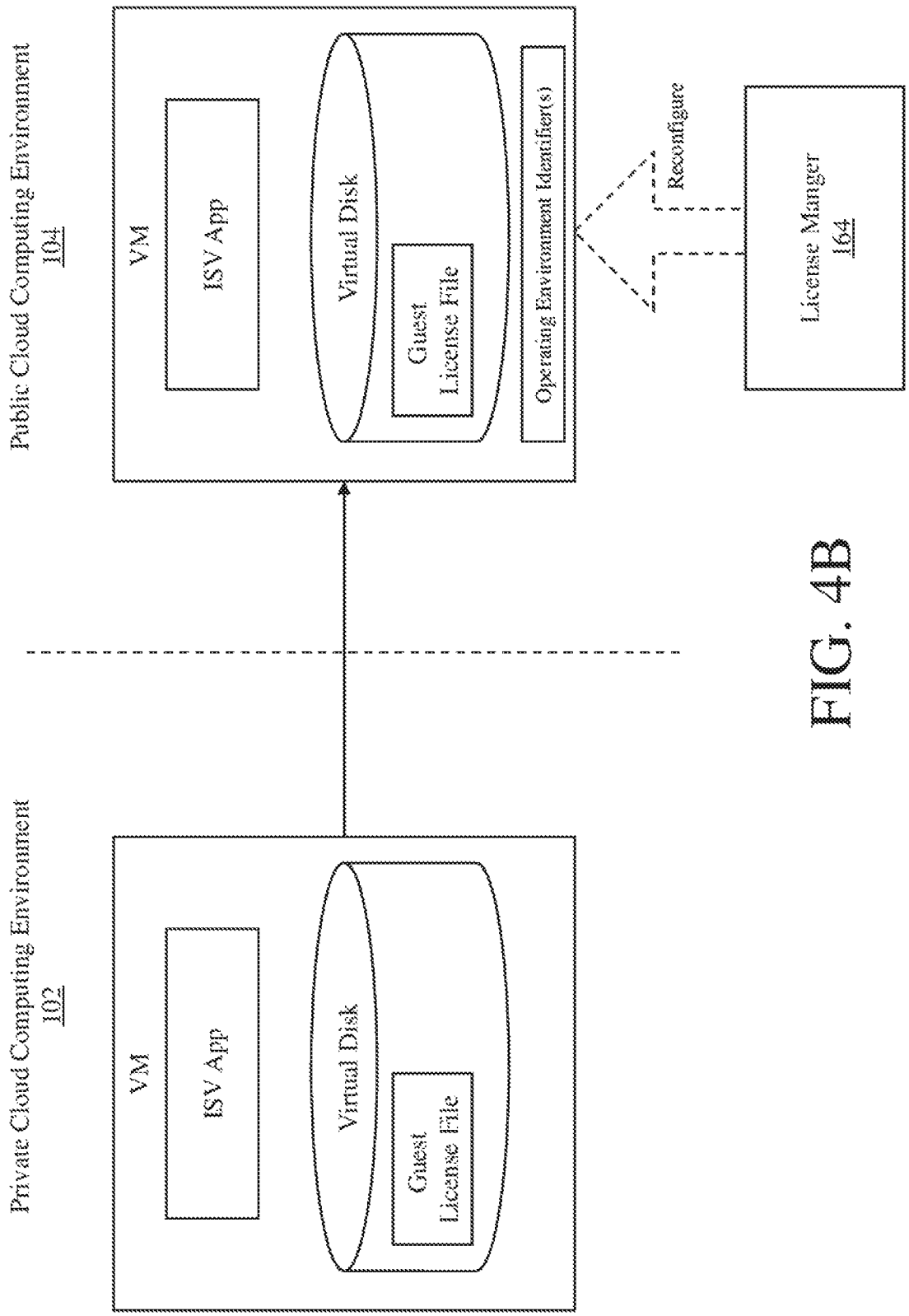
FIG. 4B illustrates reconfiguring a VM to inject one or more operating environment identifiers into the VM as additional configuration parameters in accordance with an embodiment of the invention.

In another embodiment, one or more operating environment identifiers can be injected into the VM as additional configuration parameters that an ISV application can access using in-guest tools. This is accomplished by reconfiguring the VM so that the VM includes additional configuration parameters that represent or correspond to the operating environment identifiers, as illustrated in FIG. 4B. In FIG. 4B, a VM with an ISV application and a virtual disk has been moved from the private cloud computing environment 102 to the public cloud computing environment 104. As shown in this figure, operating environment identifiers are inserted into the VM by reconfiguring the VM.

In a particular embodiment, one or more operating environment identifiers are injected into the VM as additional configuration parameters by searching for the VM in the virtualization manager that is supporting the VM or the cloud manager 130 using the VM identification found in the event notification. Upon finding the VM, the environment identification controller 306 fetches a configuration specification object on that VM, which may be an Extensible Markup Language (XML) input file. The environment identification controller then sets a new array of extra configurations in the configuration specification object based on the operating environment information of the VM to produce a revised configuration specification object. This may be achieved using a particular API call to the cloud manager, e.g., a VirtualMachineConfigSpec API call. The environment identification controller then initiates a reconfiguration command or instructs the virtualization manager to reconfigure the VM using the revised configuration specification object. Using this process, two types of metrics can be injected into the VM. The first type of metrics includes guest-level metrics, which are static and can be read by an ISV application using in-guest tools. The following is the Windows and Linux command to read this type of metrics:

```
[root@CentOS63-32-001 ~]# vmtoolsd --cmd "info-get guestinfo.PlatformId"
vCloudAir
[root@CentOS63-32-001 ~]#
VM tools is located at the following path
UNIX/Linux - /usr/bin/vmtoolsd
Windows - C:\Program Files\VMware\VMware Tools\vmtoolsd.exe
```

The second type of metrics includes a metric that when set modifies a flag in a configuration file of the VM (e.g., an enableHostInfo flag in the vmx file) to an enable state (e.g., "true"), and thereby enables the ISV application to fetch host-level information from inside the VM. Thus, with this metric, a feature of the VM is enabled that makes detailed information about the physical host available to an ISV application running in the VM.

With the operating environment identifier(s) injected into the VM, an ISV application running on that VM can access the operating environment identifier(s) to apply the appropriate end-user license terms based on the current operating environment in which the ISV application is running, such as the type of cloud computing environment in which the VM is running, the hardware platform of the physical host on which the VM is running and/or the geographical location of that physical host. For example, if the end-user license terms of the ISV application specify that the ISV application is not authorized to operate in the current operating environment, the ISV application may become disabled or may operate with limited features. In addition, the ISV application may inform the user that additional license fee may be required to operate the ISV application with full features in the current operating environment.

In an embodiment, one or more operating environment identifiers are injected into a VM by the environment identification controller 306 as temporary metadata information in a guest file on the virtual disk of the VM so that the added operating environment identifiers are automatically deleted from the VM under certain conditions or processes, such as when the VM is copied, when the VM is powered off and when the VM is exported. Consequently, when the VM is "moved" from the public cloud computing environment 104 to another computing environment (e.g., the private cloud computing environment 102) due to an environment-changing event, the VM is reverted back to the state before the VM was "moved" to the public cloud computing environment. Thus, if the VM is "moved" to a private cloud computing environment, the VM may reflect a default state when an ISV application running on the VM performs an end-user license check. However, if the VM is "moved" to another public cloud computing environment or powered back on in the same public cloud computing environment, the license manager of that public cloud computing environment can re-inject the operating environment identifiers back into the VM. The automatic removal feature with respect to the operating environment identifiers injected into VMs prevents scenarios where a powered-off VM is copied and moved to another operating environment along with the operating environment identifiers, which would not be correct for the new operating environment.

Figure 5A:
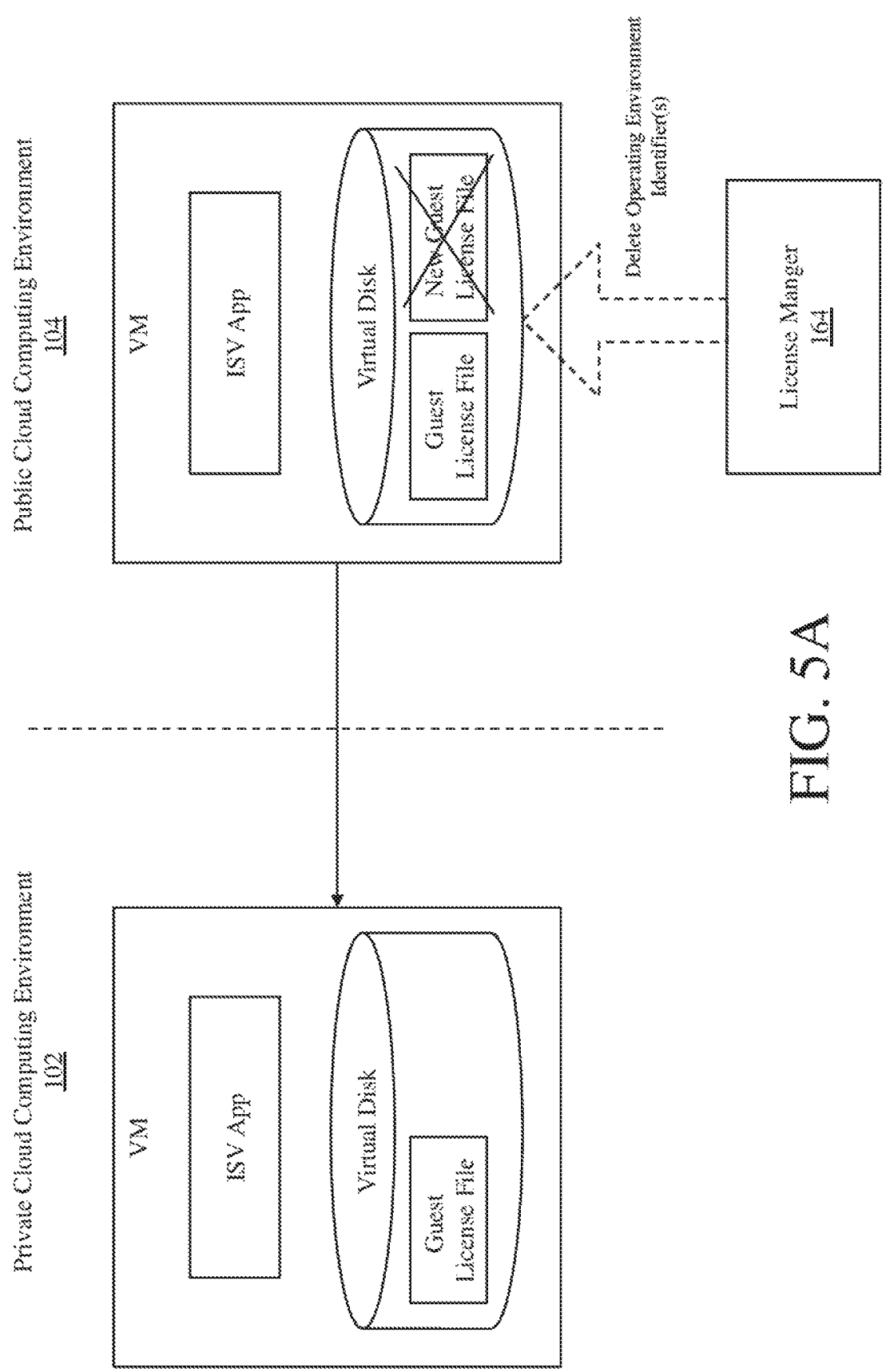
FIG. 5A illustrates deleting a guest license file or the contents of the guest license file or modifying the guest license file to remove the operating environment identifier(s) injected into a VM in accordance with an embodiment of the invention.

In another embodiment in which the operating environment identifiers injected to VMs are not automatically deleted under certain conditions or processes (e.g., VM copy, VM power-off and VM export), the injected operating environment identifiers in each VM may be actively removed by the license manager 164 before the VM is moved out of the public cloud computing environment 104. As an example, this embodiment would apply to a situation where one or more operating environment identifiers were injected into a VM by reconfiguring the VM using a revised configuration specification object. In this embodiment, the license manager performs operations to remove the operating environment identifiers previously injected into each VM when an environment-changing event, which may involve one or more VMs being "moved" from the public cloud computing environment to a private cloud computing environment (e.g., the private cloud computing environment 102), is detected by the event detector 302. When a VM is being "moved" out of the public cloud computing environment due to the detected environment-changing event, the event interrupter 304 traps or interrupts the environment-changing event to provide an interrupt period. In one embodiment, the environment-changing event may be trapped any time before the completion of the environment-changing event. The environment identification controller 306 then removes each injected operating environment identifier from the VM being "moved" during the interrupt period. If the operating environment identifiers were inserted into an existing or new guest license file on the virtual disk of the VM, the environment identification controller 306 may delete the guest license file or the contents of the guest license file or modify the guest license file to remove the operating environment identifier(s) injected into the VM, as illustrated in FIG. 5A. In FIG. 5A, the license manager (1) deletes the new guest license file on a virtual disk of the VM being "moved" if the operating environment identifiers were added to this file or (2) modifies the existing guest license file if the operating environment identifiers were added to this file.

Figure 5B:
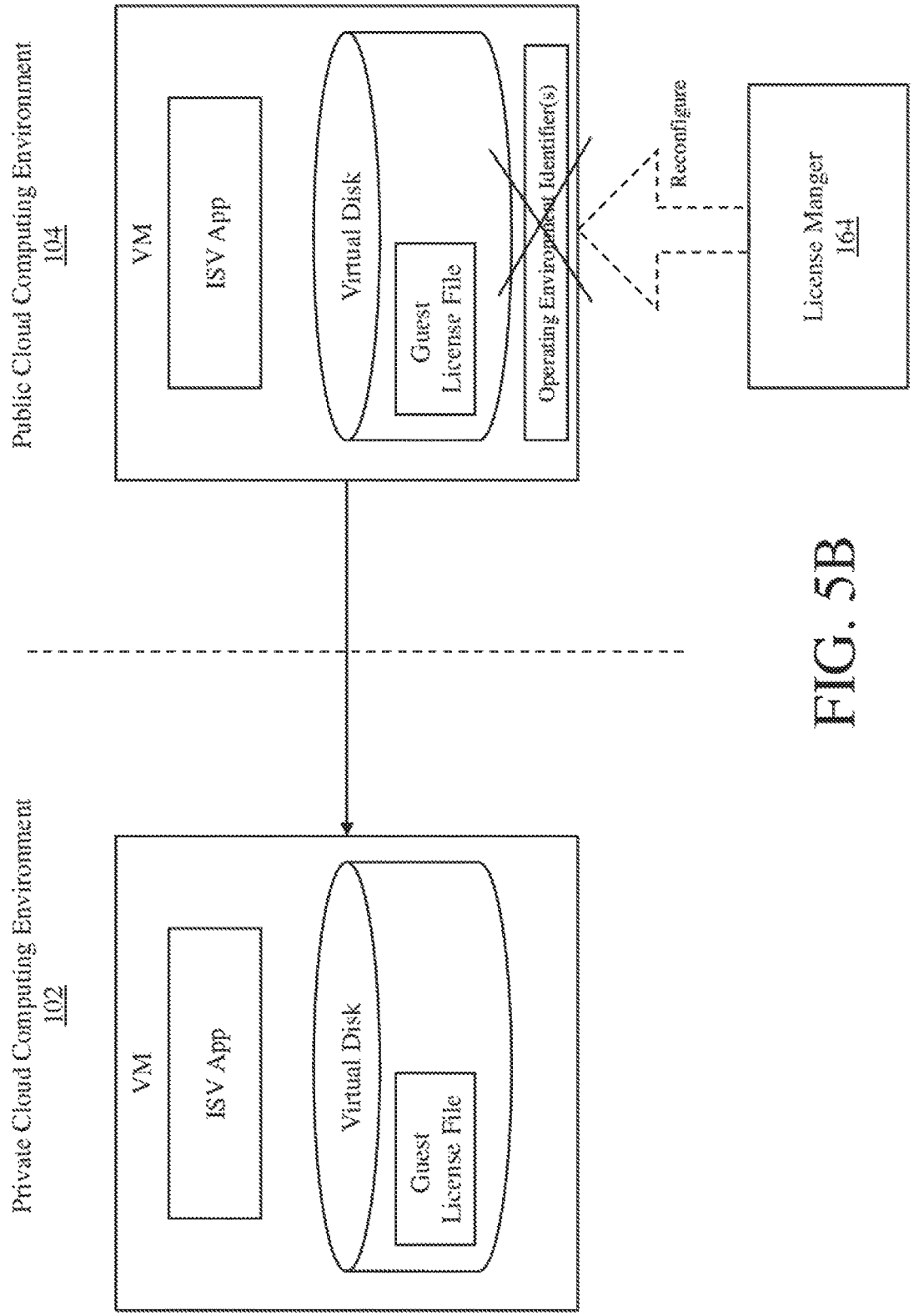
FIG. 5B illustrates reconfiguring a VM back to the previous configuration of the VM to remove the operating environment identifiers that were injected as additional parameters of the VM in accordance with an embodiment of the invention.

However, if the operating environment identifiers were injected into a VM by reconfiguring the VM using a revised configuration specification object, the environment identification controller 306 may modify the revised configuration specification object back to the previous version. The license manager may then initiate a reconfiguration command or instruct the appropriate virtualization manager 152 to reconfigure the VM back to its previous configuration using the modified configuration specification object to remove the additional parameters of the VM that correspond to the operating environment identifiers, as illustrated in FIG. 5B. In FIG. 5B, the license manager 164 reconfigures the VM back to the previous configuration of the VM before the VM was "moved" to the public cloud computing environment 104 using a modified configuration specification object to remove the operating environment identifiers that were injected as additional parameters of the VM.

As a result of the removal of the operating environment identifiers from the VM, if the VM is "moved" from the public cloud computing environment 104 to a private cloud computing environment (e.g., the private cloud computing environment 102) as part of the environment-changing event, the VM may reflect a default state when an ISV application running on the VM performs an end-user license check at the new computing environment. However, if the VM is "moved" to another public cloud computing environment or powered back on in the same public cloud computing environment, the license manager of that public cloud computing environment can inject or re-inject the appropriate operating environment identifiers into the VM so that an ISV application running on the VM can correctly perform a license check using the injected operating environment identifiers of the VM to determine the current operating environment of the ISV application.

Figure 6:
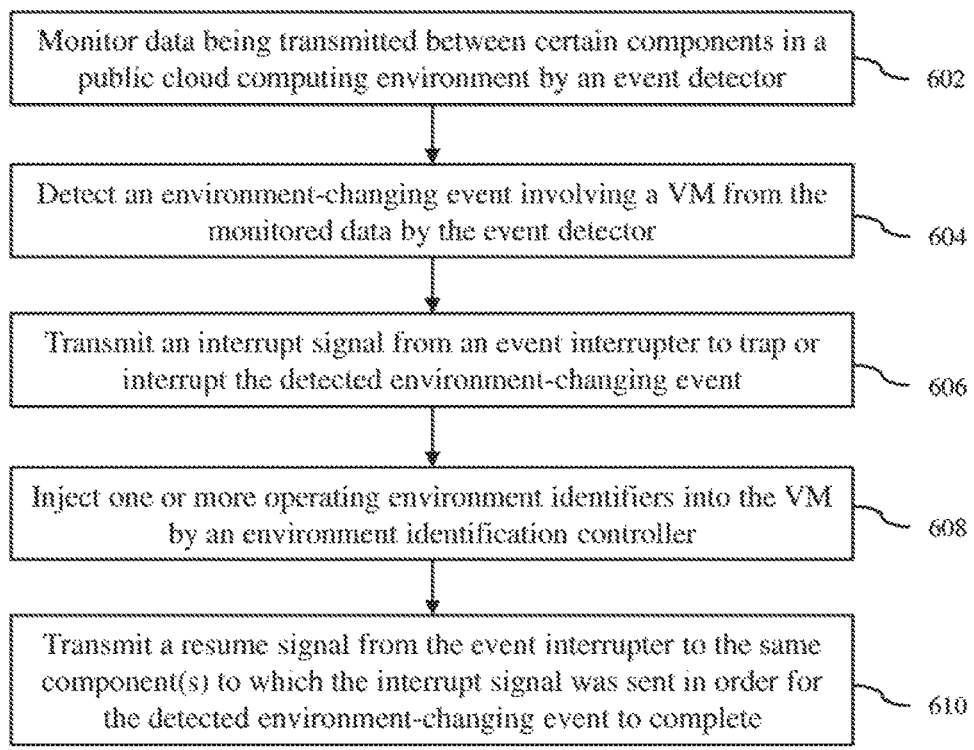
FIG. 6 is a flow diagram of an operation of the license manager for an environment-changing event involving a VM being moved from a private cloud computing environment to a public cloud computing environment in accordance with an embodiment of the invention.

The operation of the license manager 164 for an environment-changing event involving a VM being moved from the private cloud computing environment 102 to the public cloud computing environment 104 in accordance with an embodiment of the invention will be described with reference to a flow diagram of FIG. 6. At block 602, data being transmitted between certain components in the public cloud computing environment is monitored by the event detector 302 of the license manager. As an example, data to and from the orchestration component 148, the cloud director 150, the virtualization managers 152, the hybrid cloud director 160 and/or the site recovery manager 134B may be monitored by the event detector. Next, at block 604, an environment-changing event involving a VM is detected by the event detector from the monitored data. As an example, the environment-changing event may be a VM migration event, a VM import event or a disaster recovery failover event, which may be detected when a VM migration notification, an import power-on notification or a failover notification is observed by the event detector.

Next, at block 606, an interrupt signal is transmitted from the event interrupter 304 of the license manager 164 to trap or interrupt the detected environment-changing event. Depending on the detected environment-changing event, the interrupt signal may be transmitted to at least one of the orchestration component 148, the cloud director 150, the virtualization manager 152 supporting the VM, the hybrid cloud director 160 and/or the site recovery manager 134B.

Next, at block 608, one or more operating environment identifiers are injected into the VM that is being moved as part of the detected environment-changing event by the environment identification controller 306 of the license manager 164. In one embodiment, one or more operating environment identifiers may be injected into the VM by writing the operating environment identifiers into an existing guest license file for each ISV application in the VM, which may involve changing values found in the guest license file or adding new values. In another embodiment, one or more operating environment identifiers may be injected into the VM by creating a new guest license file with the operating environment identifiers. This new guest license file may be indicated as being a temporary file so that the file is automatically deleted upon certain conditions or processes, such as VM copy, VM power-off and VM export. In still another embodiment, one or more operating environment identifiers may be injected into the VM by reconfiguring the VM using a new configuration specification object to add new parameters to the VM that reflect the operating environment identifiers.

Next, at block 610, a resume signal is transmitted from the event interrupter 304 to the same component(s) to which the interrupt signal was sent in order for the detected environment-changing event to complete.

The injected operating environment identifiers of the VM can be used by an ISV application in the VM to perform an end-user license check for the current operating environment in which the VM is operating, such as the cloud type of the current operating environment, the geographical location of the host in which the VM is operating and the hardware infrastructure of that host. The ISV application can then apply the appropriate end-user license terms based on the current operating environment in which the VM, and thus, the ISV application, is operating.

Figure 7:
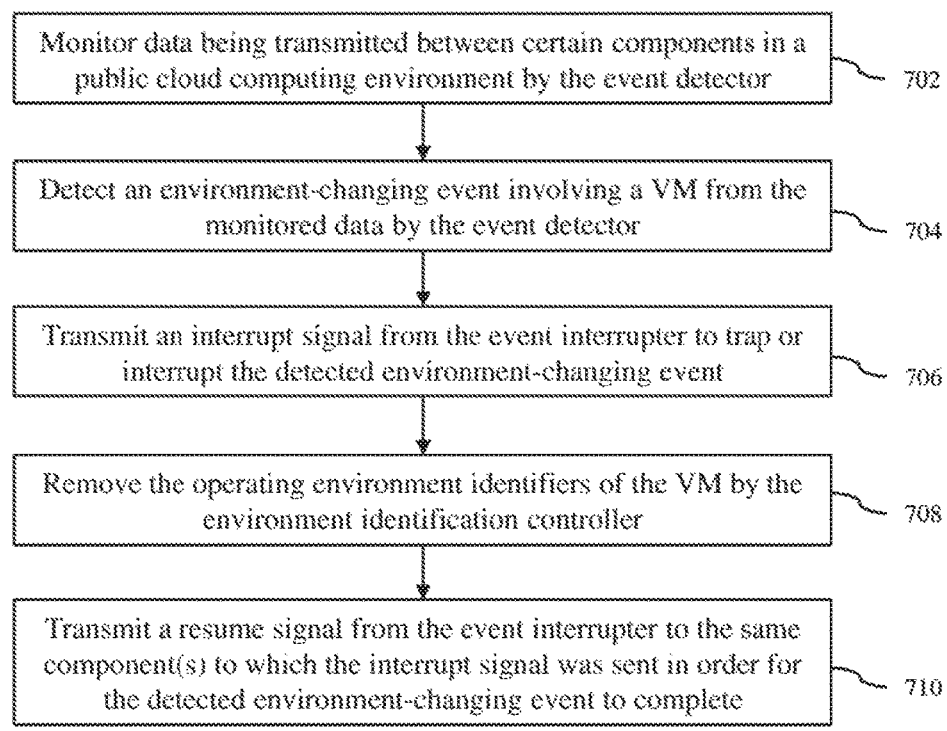
FIG. 7 is a flow diagram of an operation of the license manager for an environment-changing event involving a VM being moved from the public cloud computing environment to the private cloud computing environment in accordance with an embodiment of the invention.

The operation of the license manager 164 for an environment-changing event involving a VM being moved from the public cloud computing environment 104 to the private cloud computing environment 102 in accordance with an embodiment of the invention will be described with reference to a flow diagram of FIG. 7. In this description, it is assumed that the injected operating environment identifiers of the VM do not automatically become deleted due to the environment-changing event. At block 702, data being transmitted between certain components in the public cloud computing environment is monitored by the event detector 302 of the license manager. Next, at block 704, an environment-changing event involving a VM is detected by the event detector from the monitored data. As an example, the environment-changing event may be a VM migration event, a VM export event or a disaster recovery failback event, which may be detected when a VM migration notification, an export power-off notification or a failback notification is observed by the event detector.

Next at block 706, an interrupt signal is transmitted from the event interrupter 304 of the license manager 164 to trap or interrupt the detected environment-changing event. Depending on the detected environment-changing event, the interrupt signal may be transmitted to at least one of the orchestration component 148, the cloud director 150, the virtualization manager 152 supporting the VM, the hybrid cloud director 160 and/or the site recovery manager 134B.

Next at block 708, the operating environment identifiers of the VM are removed by the environment identification controller 306 of the license manager 164. In the embodiment in which the operating environment identifiers were added to an existing guest license file for each ISV application in the VM, the exiting guest license file may be modified back to its previous version by the environment identification controller to remove the operating environment identifiers. In the embodiment in which the operating environment identifiers were added to a new guest license file for each ISV application in the VM, the new guest license file or the contents of the new guest license file may be deleted by the environment identification controller to remove the operating environment identifiers from the VM. In the embodiment in which the operating environment identifiers were injected into the VM by reconfiguring the VM using a revised configuration specification object, the VM is reconfigured back to its previous configuration using a modified configuration specification object.

Next, at block 710, a resume signal is transmitted from the event interrupter 304 to the same component(s) to which the interrupt signal was sent in order for the detected environment-changing event to complete.

Figure 8:
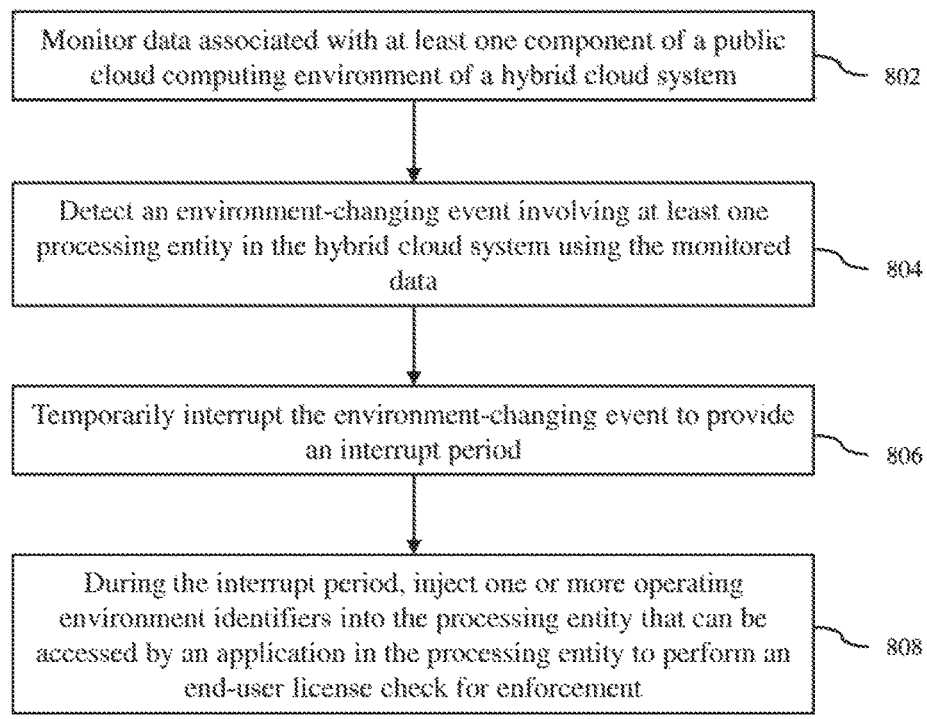
FIG. 8 is a process flow diagram of a computer-implemented method for enabling end-user license enforcement of an application in a hybrid cloud system in accordance with an embodiment of the invention.

A computer-implemented method for enabling end-user license enforcement of an application in a hybrid cloud system in accordance with an embodiment of the invention is described with reference to a process flow diagram of FIG. 8. At block 802, data associated with at least one component of a public cloud computing environment of the hybrid cloud system is monitored. At block 804, an environment-changing event involving at least one processing entity in the hybrid cloud system is detected using the monitored data. At block 806, the environment-changing event is temporarily interrupted to provide an interrupt period. At block 808, during the interrupt period, one or more operating environment identifiers are injected into the processing entity that can be accessed by an application in the processing entity to perform an end-user license check for enforcement.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer-implemented method for enabling end-user license enforcement of an application in a hybrid cloud system, the method comprising:
    monitoring data associated with at least one component of a public cloud computing environment of the hybrid cloud system;
    detecting an environment-changing event involving at least one processing entity in the hybrid cloud system using the monitored data;
    temporarily interrupting the environment-changing event to provide an interrupt period; and
    during the interrupt period, injecting one or more operating environment identifiers into the processing entity that can be accessed by an application in the processing entity to perform an end-user license check for enforcement.

2. The method of claim 1, wherein the environment-changing event involves the processing entity being moved from a private cloud computing environment of the hybrid cloud system to the public cloud computing environment of the hybrid cloud system.

3. The method of claim 1, wherein the processing entity resides in a private cloud computing environment of the hybrid cloud system, and wherein the environment-changing event involves a copy of the processing entity being activated in the public cloud computing environment of the hybrid cloud system.

4. The method of claim 1, wherein monitoring the data includes monitoring the data for an environment-changing event notification from or to the at least one component of the public cloud computing environment of the hybrid cloud system.

5. The method of claim 4, wherein the environment-changing event notification includes one of a processing entity migration notification, a processing entity import notification and a disaster recovery failover notification.

6. The method of claim 1, wherein injecting the one or more operating environment identifiers includes adding the one or more operating environment identifiers into an existing guest license file in the processing entity.

7. The method of claim 1, wherein injecting the one or more operating environment identifiers includes creating a new guest license file with the one or more operating environment identifiers in the processing entity.

8. The method of claim 7, wherein the new guest license file is a temporary file that is automatically deleted when the processing entity is copied, powered off or exported from the public cloud computing environment.

9. The method of claim 1, wherein injecting the one or more operating environment identifiers includes reconfiguring the processing entity to inject the one or more operating environment identifiers as additional configuration parameters of the processing entity.

10. The method of claim 1, further comprising actively removing the one or more operating environment identifiers from the processing entity when another environment-changing event is detected that indicates the processing entity being taken out of the public cloud computing environment.

11. The method of claim 1, wherein the processing entity is a virtual machine.

12. A non-transitory computer-readable storage medium containing program instructions for enabling end-user license enforcement of an application in a hybrid cloud system, wherein execution of the program instructions by one or more processors causes the one or more processors to perform steps comprising:
monitoring data associated with at least one component of a public cloud computing environment of the hybrid cloud system;
detecting an environment-changing event involving at least one processing entity in the hybrid cloud system using the monitored data;
temporarily interrupting the environment-changing event to provide an interrupt period; and
during the interrupt period, injecting one or more operating environment identifiers into the processing entity that can be accessed by an application in the processing entity to perform an end-user license check for enforcement.

13. The non-transitory computer-readable storage medium of claim 12, wherein the environment-changing event involves the processing entity being moved from a private cloud computing environment of the hybrid cloud system to the public cloud computing environment of the hybrid cloud system.

14. The non-transitory computer-readable storage medium of claim 12, wherein the processing entity resides in a private cloud computing environment of the hybrid cloud system, and wherein the environment-changing event involves a copy of the processing entity being activated in the public cloud computing environment of the hybrid cloud system.

15. The non-transitory computer-readable storage medium of claim 12, wherein monitoring the data includes monitoring the data for an environment-changing event notification from or to the at least one component of the public cloud computing environment of the hybrid cloud system.

16. The non-transitory computer-readable storage medium of claim 15, wherein the environment-changing event notification includes one of a processing entity migration notification, a processing entity import notification and a disaster recovery failover notification.

17. The non-transitory computer-readable storage medium of claim 12, wherein injecting the one or more operating environment identifiers includes adding the one or more operating environment identifiers into an existing guest license file in the processing entity.

18. The non-transitory computer-readable storage medium of claim 12, wherein injecting the one or more operating environment identifiers includes creating a new guest license file with the one or more operating environment identifiers in the processing entity.

19. The non-transitory computer-readable storage medium of claim 18, wherein the new guest license file is a temporary file that is automatically deleted when the processing entity is copied, powered off or exported from the public cloud computing environment.

20. The non-transitory computer-readable storage medium of claim 12, wherein injecting the one or more operating environment identifiers includes reconfiguring the processing entity to inject the one or more operating environment identifiers as additional configuration parameters of the processing entity.

21. The non-transitory computer-readable storage medium of claim 12, wherein the steps further comprise actively removing the one or more operating environment identifiers from the processing entity when another environment-changing event is detected that indicates the processing entity being taken out of the public cloud computing environment.

22. A computer system comprising:
memory; and
one or more processors configured to:
monitor data associated with at least one component of a public cloud computing environment of a hybrid cloud system;
detect an environment-changing event involving at least one processing entity in the hybrid cloud system using the monitored data;
temporarily interrupt the environment-changing event to provide an interrupt period; and
during the interrupt period, inject one or more operating environment identifiers into the processing entity that can be accessed by an application in the processing entity to perform an end-user license check for enforcement.

23. The computer system of claim 22, wherein the environment-changing event involves the processing entity being moved from a private cloud computing environment of the hybrid cloud system to the public cloud computing environment of the hybrid cloud system.

24. The computer system of claim 22, wherein the processing entity resides in a private cloud computing environment of the hybrid cloud system, and wherein the environment-changing event involves a copy of the processing entity being activated in the public cloud computing environment of the hybrid cloud system.

25. The computer system of claim 22, wherein the one or more processors are further configured to add the one or more operating environment identifiers into an existing guest license file in the processing entity or create a new guest license file with the one or more operating environment identifiers in the processing entity to inject the one or more operating environment identifiers into the processing entity.

26. The computer system of claim 22, wherein the one or more processors are further configured to reconfigure the processing entity to inject the one or more operating environment identifiers as additional configuration parameters of the processing entity.

* * * * *